United States Patent
Xu et al.

(10) Patent No.: US 9,912,525 B2
(45) Date of Patent: *Mar. 6, 2018

(54) APPARATUS AND METHOD FOR DETECTING CAUSE OF RADIO LINK FAILURE OR HANDOVER FAILURE IN MOBILE COMMUNICATION SYSTEM

(71) Applicant: Samsung Electronics Co., Ltd., Suwon-si, Gyeonggi-do (KR)

(72) Inventors: Lixiang Xu, Beijing (CN); Gert-Jan Van Lieshout, Apeldoorn (NL); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

This patent is subject to a terminal disclaimer.

(21) Appl. No.: 14/673,115

(22) Filed: Mar. 30, 2015

(65) Prior Publication Data
US 2015/0207672 A1    Jul. 23, 2015

Related U.S. Application Data

(63) Continuation of application No. 13/234,759, filed on Sep. 16, 2011, now Pat. No. 9,001,716.

(30) Foreign Application Priority Data

Sep. 21, 2010    (CN) .......................... 2010 1 0292445

(51) Int. Cl.
*H04B 7/00*    (2006.01)
*H04L 12/24*    (2006.01)
(Continued)

(52) U.S. Cl.
CPC ..... *H04L 41/0654* (2013.01); *H04W 36/0055* (2013.01); *H04W 76/027* (2013.01);
(Continued)

(58) Field of Classification Search
CPC .... H04W 76/027; H04W 24/00; H04W 36/00
(Continued)

(56) References Cited

U.S. PATENT DOCUMENTS 7,983,221 B2    7/2011 Aydin et al.
8,369,854 B2    2/2013 Peisa et al.
(Continued)

FOREIGN PATENT DOCUMENTS

CN    101400088 A    4/2009
CN    101578897 A    11/2009
(Continued)

OTHER PUBLICATIONS

Alcatel-Lucent, Idle Mode Logged MDT reporting mechanism, 3GPP TSG-RAN WG2 Meeting #69bis, R2-102056, Apr. 4, 2010, Beijing, China.
(Continued)

*Primary Examiner* — Dmitry H Levitan
(74) *Attorney, Agent, or Firm* — Jefferson IP Law, LLP

(57) ABSTRACT

A terminal, a Base Station (BS) and a method for detecting a cause of a Radio Link Failure (RLF) or handover failure are provided. The method includes determining whether an RLF or a handover failure occurs, performing a process of a connection re-establishment or connection establishment to enter a connection mode after encountering the RLF or the handover failure, and transmitting an RLF information report to a BS after entering the connection mode.

20 Claims, 8 Drawing Sheets

(51) Int. Cl.
*H04W 76/02* (2009.01)
*H04W 76/06* (2009.01)
*H04W 24/00* (2009.01)
*H04W 36/00* (2009.01)
*H04W 88/08* (2009.01)

(52) U.S. Cl.
CPC ....... *H04W 76/028* (2013.01); *H04W 76/068* (2013.01); *H04W 24/00* (2013.01); *H04W 36/00* (2013.01); *H04W 88/08* (2013.01)

(58) Field of Classification Search
USPC ................ 370/310, 312, 328–332, 342, 345; 455/422, 423, 436–443
See application file for complete search history.

(56) References Cited

U.S. PATENT DOCUMENTS

| | | |
|---|---|---|
| 8,515,415 B2 | 8/2013 | Dimou et al. |
| 8,576,797 B2 | 11/2013 | Jang et al. |
| 8,737,359 B2 * | 5/2014 | Catovic ................... H04L 5/003 370/332 |
| 8,867,484 B2 * | 10/2014 | Sebire ............... H04M 15/8038 370/331 |
| 9,107,133 B2 * | 8/2015 | Catovic ................. H04W 36/30 |
| 2002/0114288 A1 | 8/2002 | Soliman |
| 2009/0257353 A1 | 10/2009 | Song et al. |
| 2010/0124918 A1 | 5/2010 | Agashe et al. |
| 2010/0173626 A1 | 7/2010 | Catovic et al. |
| 2010/0267378 A1 | 10/2010 | Hamabe et al. |
| 2011/0053588 A1 | 3/2011 | Al-Khudairi et al. |
| 2014/0194123 A1 | 7/2014 | Wang et al. |
| 2015/0131617 A1 | 5/2015 | Kitazoe |

FOREIGN PATENT DOCUMENTS

| | | |
|---|---|---|
| CN | 101815314 A | 8/2010 |
| KR | 10-2010-0071795 A | 6/2010 |
| RU | 2 233 546 C2 | 7/2004 |
| WO | 2010/057123 A2 | 5/2010 |

OTHER PUBLICATIONS

Samsung, Additional RLF information reporting for MRO, 3GPP TSG-RAN WG3 Meeting #66bis, R3-100323, Jan. 15, 2010, Valencia, Spain.

Samsung, Necessity information in RLF reporting for MRO, 3GPP TSG-RAN WG3 Meeting #65bis, R3-092422, Oct. 2, 2009, Miyazaki, Japan.

Zte, Coverage and Capacity optimization, 3GPP TSG RAN WG3 #68, R3-101542, May 1, 2010, Montreal, Canada.

Huawei, Implications of MRO performance measurements, 3GPP TSG-RAN WG3 #65bis, R3-092324, Oct. 2, 2009, Miyazaki, Japan.

Deutsche Telekom, et al., "Enhancements for RLF reporting", 3GPP TSG RAN WG2 #71, R2-104507, Aug. 23-27, 2010.

Samsung, "Clarifications regarding setting rlf—InfoAvailable", 3GPP TSG RAN WG2 #71, R2-104892, Aug. 23-27, 2010.

Nokia Siemens Networks, "RN behaviour from Idle after RLF", 3GPP TSG RAN WG2 #71, R2-104396, Aug. 23-27, 2010.

3rd Generation Partnership Project; Technical Specification Group Radio Access Network; Evolved Universal Terrestrial Radio Access (E-UTRA) and Evolved Universal Terrestrial Radio Access Network (E-UTRAN); Overal description; Stage 2 (Release 8); 3GPP TS 36.300, Mar. 2010, pp. 1-149, V8.12.0.

Huawei, RLF Analysis, 3GPP TSG RAN WG2 Meeting #61 bis, R2-081697, Mar. 31-Apr. 3, 2008, pp. 1-3.

3GPP TSG RAN WG3 Meeting #69, R3-1 02060, RLF report at RRC establishment, Huawei, Aug. 23-27, 2010, pp. 1 and 2.

3GPP TSG RAN WG2 Meeting #71, R2-1 04671, UE radio link failure, Huawei, Aug. 23-27, 2010, pp. 1 and 2.

3GPP TSG RAN WG2 Meeting #70, R2-102751, Enhancements for RLF reporting, Deutsche Telecom, May 10-14, 2010, pp. 1 and 2.

Huawei, "RLF report at RRC establishment", 3GPP TSG RAN WG3 Meeting #69 R3-102060, Madrid, Spain, Aug. 23-27, 2010.

"Specification impact for Mobility Robustness Optimisation", 3GPP TSG-RAN WG3, R3-091192, 10.3.5, San Francisco, CA, May 4-8, 2009.

Huawei: LIE RLF report, 12-15 3GPP Draft; R2-101265 UE RLF Rep0rt, 3rd Generation Partnership Project (3GPP), Mobile Competence Centre ; 650, Route des Lucioles ; F-06921 Sophia-Antipolis Cedex ; France, vol. RAN WG2, No. San Francisco, USA; Feb. 22, 2010, Feb. 16, 2010 (Feb. 16, 2010), XP050421784.

Huawei: UE RLE report for Mobility 1,3,5,6, Robustness Optimisation, 3GPP Draft; R3-100899 UE RLE Report for Mobility Robustiness Optimisation, 3rd Generation Partnership Project (3GPP), Mobile Competence Centre ; 650, Route des Lucioles ; F-06921 Sophia-Antipolis Cedex; France, vol. RAN WG3, No. San Francisco, USA; Feb. 22, 2010, Feb. 12, 2010 (Feb. 12, 2010), XP050425385.

Nokia Siemens Networks: Enabling MR0 in case of re-establishment request in unprepared eNB, 3GPP Draft; R3-101644 S0N_ MR0_Idle, 3rd Generation Partnership Project (3GPP), Mobile Competence Centre ; 650, Route des Lucioles ; F-06921 Sophia-Antipolis Cedex; France, vol. RAN WG3, No. Montreal, Canada; May 10, 2010, May 1, 2010 (May 1, 2010), XP050425385.

* cited by examiner

APPARATUS AND METHOD FOR DETECTING CAUSE OF RADIO LINK FAILURE OR HANDOVER FAILURE IN MOBILE COMMUNICATION SYSTEM

PRIORITY

This application is a continuation application of a prior application Ser. No. 13/234,759, filed on Sep. 16, 2011, which claimed the benefit under 35 U.S.C. § 119(a) of a Chinese patent application filed in the Chinese Intellectual Property Office on Sep. 21, 2010 and assigned Serial No. 201010292445.3, the entire disclosure of which is hereby incorporated by reference.

BACKGROUND OF THE INVENTION

1. Field of the Invention

The present invention relates to the field of mobile communication systems. More particularly, the present invention relates to a method for detecting the cause of a Radio Link Failure (RLF) or handover failure in mobile communication systems.

2. Description of the Related Art

Along with the development of communication technologies, the mobile communication system has evolved into a System Architecture Evolution (SAE) system. FIG. 1 is a schematic diagram illustrating a structure of the SAE system according to the related art. Referring to FIG. 1, the SAE system includes an Evolved Universal Terrestrial Radio Access Network (E-UTRAN) 101 and a core network containing a Mobile Management Entity (MME) 105 and a Serving Gateway (S-GW) 106. The E-UTRAN 101 is configured to connect a User Equipment (UE) to the core network, and includes more than one evolved Node B (eNB) 102 and more than one Home eNB (HeNB) 103, and further includes an optional HeNB GateWay (HeNB GW) 104. The MME 105 and the S-GW 106 may be integrated in one module or may be implemented separately. An eNB 102 is connected with another eNB 102 via an X2 interface, and is connected with the MME 105 and the S-GW 106 respectively via an S1 interface. A HeNB 103 is connected with the MME 105 and the S-GW 106 respectively via an S1 interface; or is connected with the optional HeNB GW 104 via an S1 interface, and the HeNB GW 104 is then connected with the MME 105 and the S-GW 106 respectively via an S1 interface.

At an early stage of SAE system deployment or during an SAE system operating stage, it should take a large number of human and material resources to optimize parameters of the SAE system, especially radio parameters, so as to guarantee good coverage and capacity, mobile robustness, load balance when moving, and sufficient access speed of the UE in the SAE system. To save the manual and material resources consumed during the SAE system operation process, a method for self-optimizing the SAE system is currently proposed. During a self-optimization process, configurations of the eNB or HeNB are optimized according to a current state of the SAE system. Both the eNB and the HeNB may both be referred to as an eNB for convenience in explanation in the following description of the method for self-optimizing the SAE system.

FIG. 2 is a schematic diagram illustrating a basic principle for self-optimizing a SAE system according to the related art. Referring to FIG. 2, after the eNB turns on power or accesses the SAE system, a self-configuring process can be started. The self-configuring process includes basic configuration 210 and initial radio parameter configuration 220 for the eNB. The basic configuration 210 for the eNB includes configuring an Internet Protocol (IP) address of the eNB and detecting Operation Administration and Maintenance (OAM) 211, authenticating between the eNB and the core network 212, detecting the HeNB GW that the eNB belongs to when the eNB is the HeNB 213, and downloading parameters of software and operations of the eNB for self-configuration 214. The initial radio parameter configuration 220 is implemented according to experience or simulation. Because performance of each eNB in the SAE system will be affected by the environment of an area where the eNB is located, the eNB initializes the radio parameter configuration according to the environment of the area where the eNB is located. Specifically, the eNB performs the initial configuration for a neighboring area list 221 and the initial configuration for the load balance 222. After the self-configuring process, many parameters configured by the eNB are not the optimized. Therefore, in order to increase the performance of the SAE system, the configuration of the eNB should be optimized or adjusted, which is also referred to as self-optimization of the mobile communication system. The optimization or adjustment of the configuration of the eNB may be implemented by the eNB under the control of the OAM in the background. Specifically, there may be a standardized interface between the eNB and the OAM, and the OAM will transmit a parameter to be optimized to the eNB (i.e., eNB or HeNB) via the standardized interface, and then the eNB optimizes the parameter in the self-configuration according to the parameter to be optimized. In addition, the configuration of the eNB can also be optimized or adjusted by the eNB itself, i.e., the eNB detects and obtains performance to be optimized, and then optimizes or adjusts its parameter corresponding to the performance. Optimizing or adjusting the configuration of the eNB 230 may include self-optimizing a neighboring area list 231, self-optimizing the coverage and capacity (not shown), self-optimizing the mobile robustness (not shown), self-optimizing the load balance 232, and self-optimizing a Random Access CHannel (RACH) parameter (not shown), etc.

Currently, SAE release 8 has proposed self-optimizing a neighboring area list. Release 9 has defined basic schemes for self-optimizing the coverage and capacity and self-optimizing the mobile robustness. Basic principles of self-optimizing in the defined schemes are that according to a difference between the last successful handover time of the UE and the time that the UE tries to re-establish a Radio Resource Control (RRC) connection, the eNB determines whether handover is too late or too early or is to a wrong cell, so as to perform the self-optimization.

However, in the above scheme for the self-optimization according to the related art, after the UE successfully re-establishes the RRC connection, it is possible to determine whether the handover is too late or is to a coverage leak according to UE measurement information obtained by the UE. However, after the UE fails in re-establishing the RRC connection (e.g., the eNB receives an RRC re-establishment request but fails during the re-establishment process), if an eNB to which the UE re-establishes the RRC connection transmits a Radio Link Failure (RLF) instruction to an eNB covering a cell where the RLF occurs, the cell where the RLF occurs cannot differentiate whether it is a coverage leak or a too late handover. If the eNB to which the UE re-establishes the RRC connection does not transmit the RLF instruction to the eNB covering the cell where the RLF occurs, the cell where the RLF occurs can not know the difference between the last successful handover time of the UE and the time that the UE tries to re-establish the RRC connection, and thus can not differentiate whether the handover is too late or too early or is to a wrong cell. However, even if the UE reports the difference to the network after accessing the network again, the network may still make a wrong determination because the difference between the time that the UE tries to re-establish a RRC connection and the time of the RLF/handover failure is large.

As can be seen from the above analysis, in the self-optimization by using the method for detecting the cause of the RLF or handover failure according to the related art, after it fails to re-establish a RRC connection, the analysis on the failure cause may be wrong if the network still performs the self-optimization based on the failure cause determined by whether the RRC connection is successfully re-established. Consequently, the self-optimization process will also be wrong and network performance will be affected.

SUMMARY OF THE INVENTION

Aspects of the present invention are to address at least the above-mentioned problems and/or disadvantages and to provide at least the advantages described below. Accordingly, an aspect of the present invention is to provide a method for detecting a cause of a Radio Link Failure (RLF) or a handover failure so as to correctly perform self-optimization for the mobile communication system according to the detected cause, and can improve performance of the mobile communication system.

In accordance with an aspect of the present invention, a method for operating a terminal in a mobile communication system is provided. The method includes determining whether an RLF or a handover failure occurs, performing a process of a connection re-establishment or connection establishment to enter a connection mode after encountering the RLF or the handover failure, and transmitting an RLF information report to a BS after entering the connection mode. The RLF information report comprises at least one of information on whether the terminal has been recently handed over before encountering the RLF or the handover failure, results of measuring by the terminal a serving cell of the terminal and a neighboring cell of the terminal when the RLF or the handover failure occurs, an identity of a cell where the terminal is located before the terminal hands over to a cell in which the RLF or the handover failure occurs, an identity of the cell in which the RLF or the handover failure occurs, and, an amount of time between when the RLF or the handover failure occurs and when a subsequent connection re-establishment success or connection establishment success occurs.

In accordance with another aspect of the present invention, a method for operating a BS in a mobile communication system is provided. The method includes performing a process of a connection re-establishment or connection establishment for a terminal encountering an RLF or a handover failure, receiving an RLF information report from the terminal, and transmitting the RLF information report to another BS which controls a cell where the RLF or the handover failure occurs. The RLF information report comprises at least one of information on whether the terminal has been recently handed over before encountering the RLF or the handover failure, results of measuring by the terminal a serving cell of the terminal and a neighboring cell of the terminal when the RLF or the handover failure occurs, an identity of a cell where the terminal is located before the terminal hands over to a cell in which the RLF or the handover failure occurs, an identity of the cell in which the RLF or the handover failure occurs, and, an amount of time between when the RLF or the handover failure occurs and when the subsequent connection re-establishment success or connection establishment success occurs.

In accordance with another aspect of the present invention, a method for operating a BS in a mobile communication system is provided. The method includes receiving an RLF information report generated by a terminal encountering an RLF or a handover failure from another BS, and determining a cause of the RLF or the handover failure using the RLF information report. The RLF information report comprises at least one of information on whether the terminal has been recently handed over before encountering the RLF or the handover failure, results of measuring by the terminal a serving cell of the terminal and a neighboring cell of the terminal when the RLF or the handover failure occurs, an identity of a cell where the terminal is located before the terminal hands over to a cell in which the RLF or the handover failure occurs, an identity of the cell in which the RLF or the handover failure occurs, and, an amount of time between when the RLF or the handover failure occurs and when the subsequent connection re-establishment success or connection establishment success occurs.

In accordance with another aspect of the present invention, a terminal for use in a mobile communication system is provided. The terminal includes a controller for determining whether an RLF or a handover failure occurs, and for performing a process of a connection re-establishment or connection establishment to enter a connection mode after encountering the RLF or the handover failure, and a modem for transmitting an RLF information report to a BS after entering the connection mode. The RLF information report comprises at least one of information on whether the terminal has been recently handed over before encountering the RLF or the handover failure, results of measuring by the terminal a serving cell of the terminal and a neighboring cell of the terminal when the RLF or the handover failure occurs, an identity of a cell where the terminal is located before the terminal hands over to a cell in which the RLF or the handover failure occurs, an identity of the cell in which the RLF or the handover failure occurs, and, an amount of time between when the RLF or the handover failure occurs and when a subsequent connection re-establishment success or connection establishment success occurs.

In accordance with another aspect of the present invention, a BS for use in a mobile communication system is provided. The BS includes a controller for performing a process of a connection re-establishment or connection establishment for a terminal encountering an RLF or a handover failure, a modem for receiving an RLF information report from the terminal, and a backhaul communication unit for transmitting the RLF information report to another BS which controls a cell where the RLF or the handover failure occurs. The RLF information report comprises at least one of information on whether the terminal has been recently handed over before encountering the RLF or the handover failure, results of measuring by the terminal a serving cell of the terminal and a neighboring cell of the terminal when the RLF or the handover failure occurs, an identity of a cell where the terminal is located before the terminal hands over to the cell in which the RLF or the handover failure occurs, an identity of the cell in which the RLF or the handover failure occurs, and, an amount of time between when the RLF or the handover failure occurs and when the subsequent connection re-establishment success or connection establishment success occurs.

In accordance with another aspect of the present invention, a BS for use in a mobile communication system is provided. The BS including a backhaul communication unit for receiving an RLF information report generated by a terminal encountering an RLF or a handover failure from another BS, and a controller for determining a cause of the RLF or the handover failure using the RLF information report. The RLF information report comprises at least one of information on whether the terminal has been recently handed over before encountering the RLF or the handover failure, results of measuring by the terminal a serving cell of the terminal and a neighboring cell of the terminal when the RLF or the handover failure occurs, an identity of a cell where the terminal is located before the terminal hands over to a cell in which the RLF or the handover failure occurs, an identity of the cell in which the RLF or the handover failure occurs, and, an amount of time between when the RLF or the handover failure occurs and when the subsequent connection re-establishment success or connection establishment success occurs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
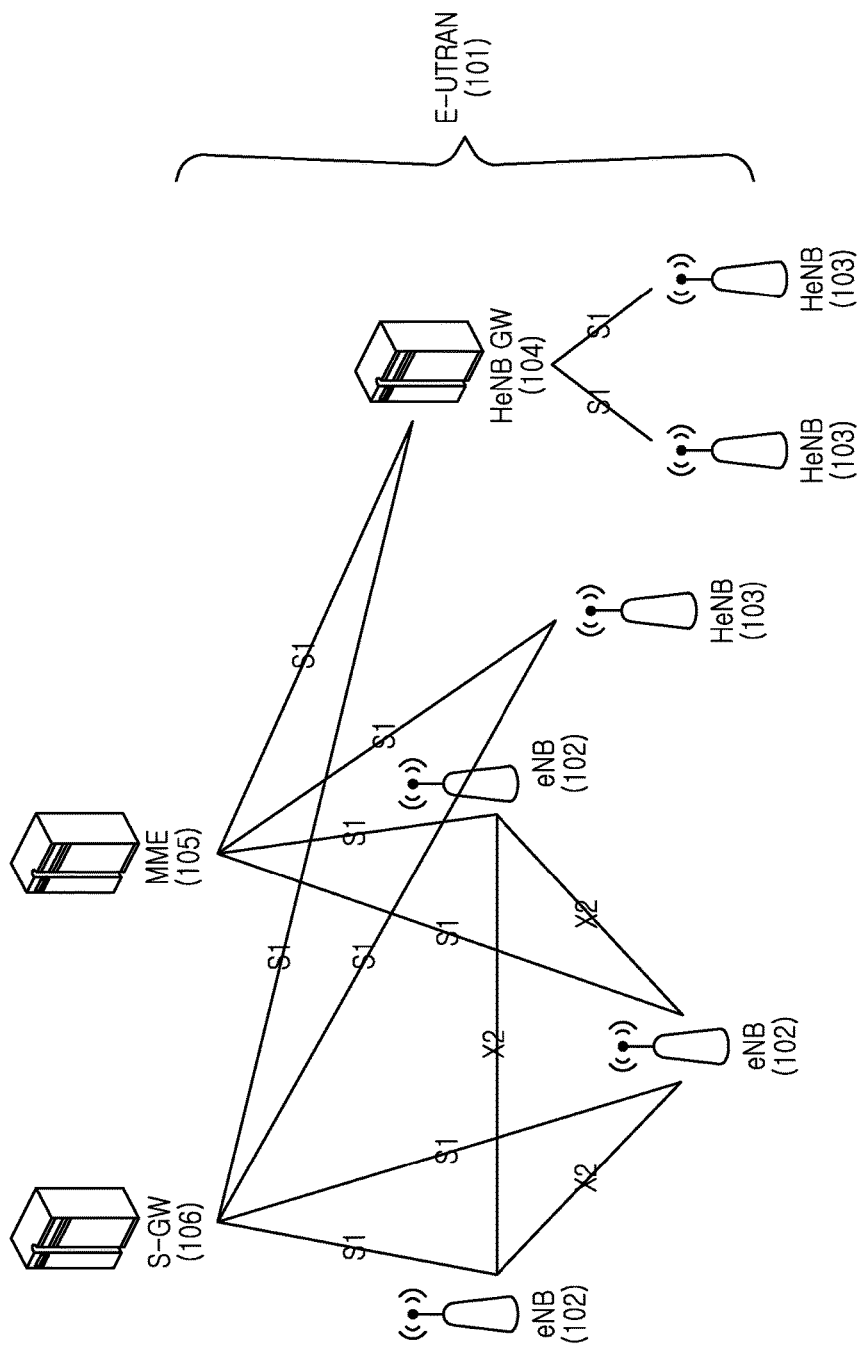
FIG. 1 is a schematic diagram illustrating a structure of a System Architecture Evolution (SAE) system according to the related art.
Figure 2:
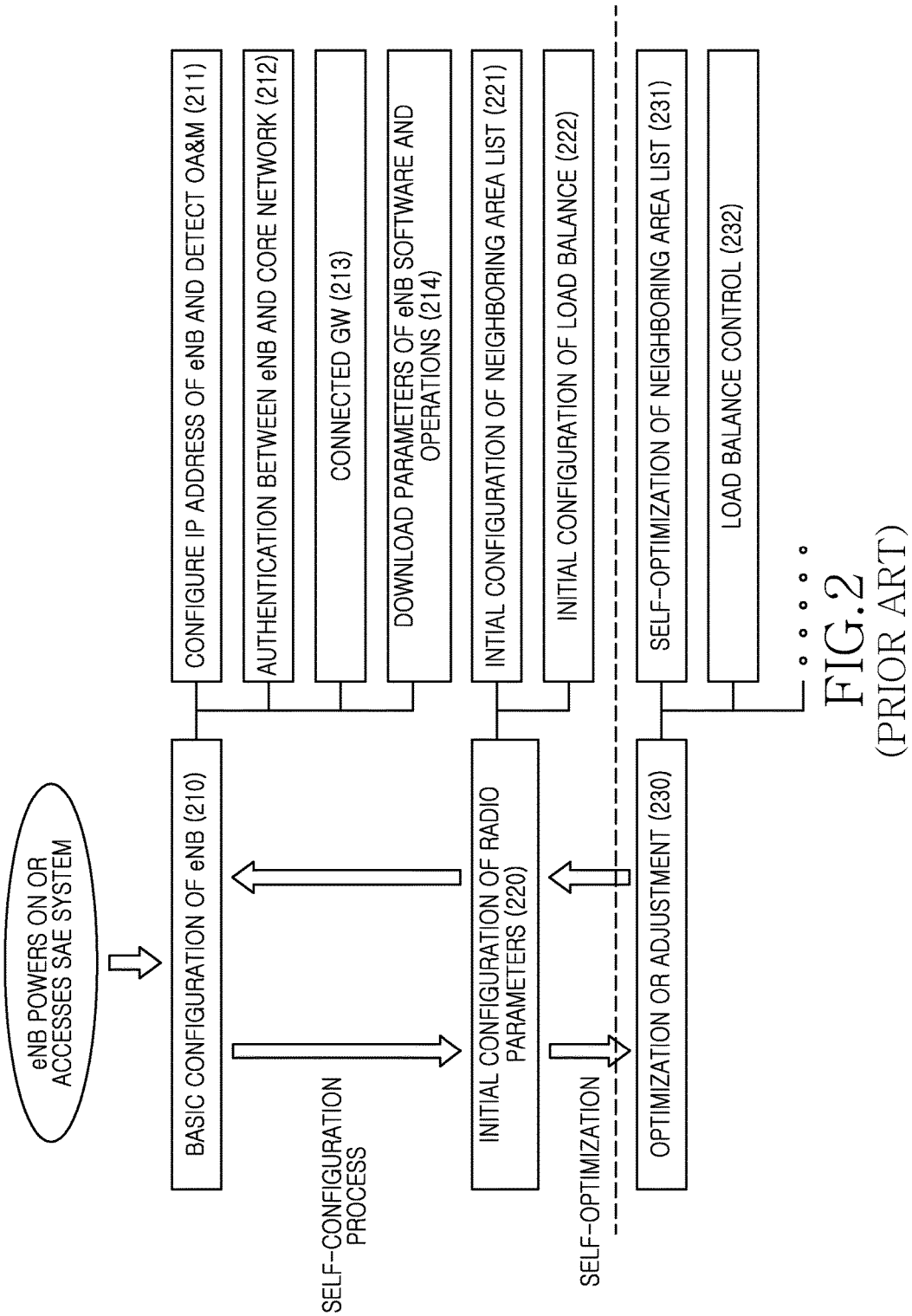
FIG. 2 is a schematic diagram illustrating a basic principle for self-optimizing a SAE system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

To solve the above problems in the related art, exemplary embodiments of the present invention provide an improved method for detecting a cause of Radio Link Failure (RLF) or handover failure. Specifically, a User Equipment (UE) transmits an RLF information report containing RLF or handover failure information to an evolved Node B (eNB), so that the eNB can correctly detect the cause of the RLF or handover failure encountered by the UE. The eNB can perform correct self-optimization for the mobile communication system according to the detected cause and thereby performance of the mobile communication system can be improved.

For convenience in description, exemplary embodiments of the present invention are described using terms and words defined in 3rd Generation Partnership Project (3GPP) Long Term Evolution (LTE). However, the present invention is not limited to these terms and words, and may be implemented in a system according to another standard. For example, the UE may be referred to as a terminal, a user terminal, a mobile station, and so on, and the eNB may be referred to as a base station, Radio Access Station (RAS), and so on.

Based on the foregoing, the technical scheme of exemplary embodiments of the present invention may be as described below.

A UE encounters a RLF or handover failure. When the UE goes into a connection mode, the UE transmits a RLF information report to an eNB, wherein the RLF information report includes at least one of information on whether the UE has been recently handed over before encountering the RLF or handover failure, UE measurement results of a serving cell and a neighboring cell of the UE when the RLF or handover failure occurs, an identity of a cell where the UE is located before the UE hands over to a cell in which the RLF or handover failure occurs, an identity of the cell in which the RLF or handover failure occurs, and the amount of time between when the RLF or handover failure occurs and when a subsequent Radio Resource Control (RRC) connection re-establishment success or RRC connection establishment success occurs. According to the RLF information report, the eNB determines whether the cause of the RLF or handover failure encountered by the UE is one of a too early handover, a too late handover, handover to a wrong cell, and a coverage hole.

To make the aspects, technical scheme and merits of the exemplary embodiments of the present invention clearer, the exemplary embodiments of the present invention will be hereinafter described in detail with reference to the accompanying drawings and the exemplary embodiments.

Figure 3:
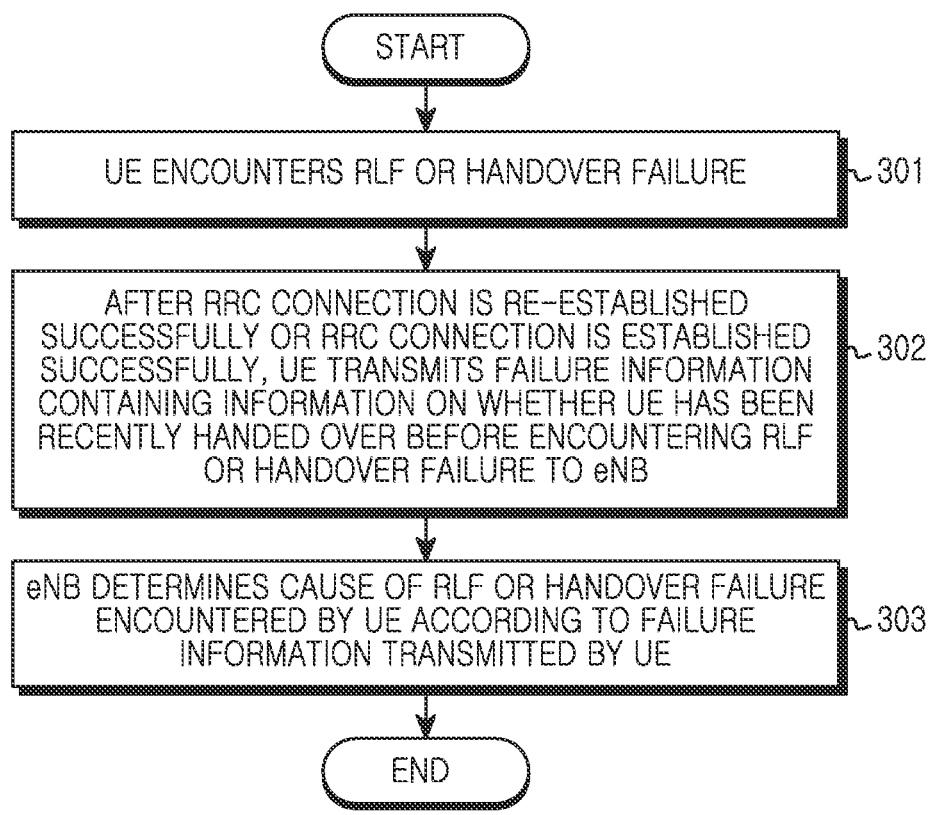
FIG. 3 is a flowchart of a method for detecting a cause of Radio Link Failure (RLF) or handover failure according to an exemplary embodiment of the present invention.

FIG. 3 is a flowchart of a method for detecting a cause of RLF or handover failure according to an exemplary embodiment of the present invention.

Referring to FIG. 3, in step 301, the UE encounters a RLF or handover failure.

In step 302, after a RRC connection is re-established successfully or a RRC connection is established successfully, the UE transmits failure information containing information on whether the UE has been recently handed over before encountering the RLF or handover failure to the eNB. In step 302, besides information on whether the UE has been recently handed over before encountering the RLF or handover failure, the failure information transmitted by the UE to the eNB may further include at least one of the results of measuring the serving cell of the UE and the neighboring cell of the UE by the UE when the RLF or handover failure occurs, such as Reference Signal Receiving Power (RSRP)/Reference Signal Receiving Quality (RSRQ), the identity of the cell where the UE is located before the UE hands over to the cell in which the RLF or handover failure occurs, such as Enhanced Cell Global Identity (ECGI) or Physical Channel Identity (PCI), the identity of the cell in which the RLF or handover failure occurs, and the amount of time between when the RLF or handover failure occurs and when the subsequent RRC connection re-establishment success or RRC connection establishment success occurs.

It should be noted that the UE may determine whether the UE has been recently handed over before encountering the RLF or handover failure. The then UE transmits an instruction, such as the instruction that the UE has been recently handed over, to the eNB. Or, the UE may directly transmit the amount of time between when the UE receives the last handover command and when the RLF or handover failure occurs to the eNB. The eNB determines whether the UE has been recently handed over before encountering the RLF or handover failure.

In step 303, the eNB determines the cause of the RLF or handover failure encountered by the UE according to the failure information transmitted by the UE.

It should be noted that, in step 303, the cause of the RLF or handover failure encountered by the UE may be one of that the UE hands over too early, that the UE hands over too late, that the UE hands over to a wrong cell, and a coverage hole.

After the foregoing, the procedure of the method for detecting the cause of the RLF or handover failure encountered by the UE is finished.

Figure 4A:
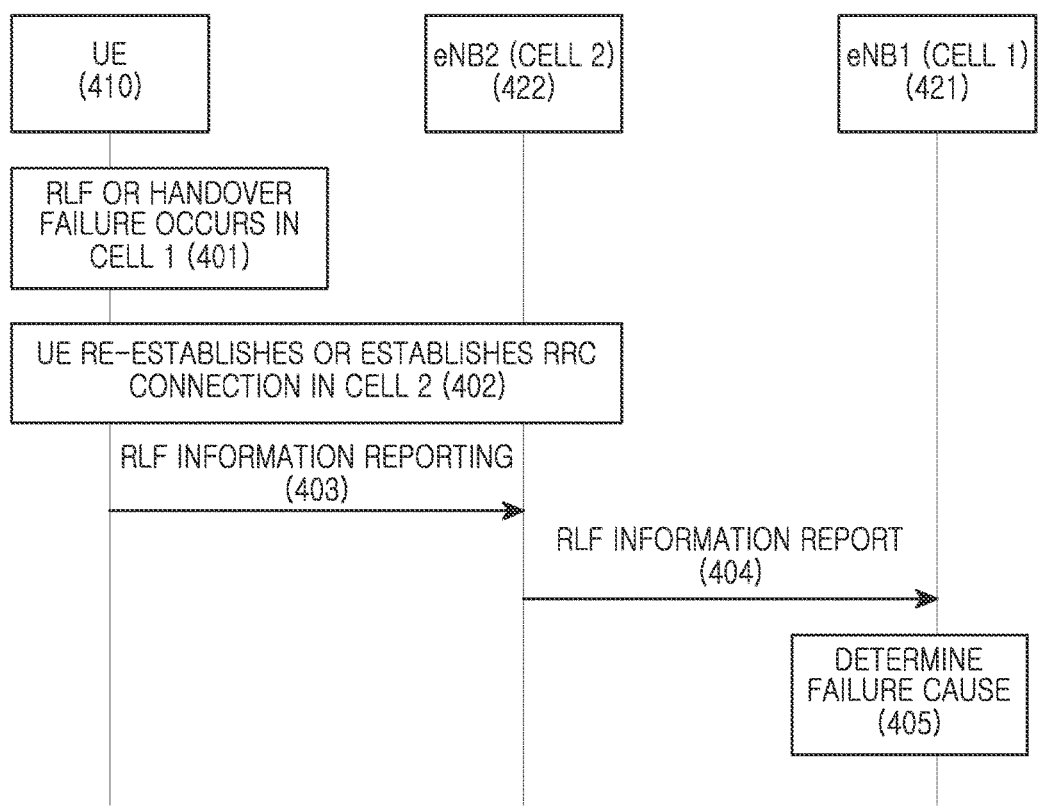
FIG. 4A is a flowchart illustrating how a User Equipment (UE) transmits RLF or handover failure information to an evolved Node B (eNB) according to an exemplary embodiment of the present invention.

FIG. 4A is a flowchart illustrating how a UE transmits RLF or handover failure information to an eNB according to an exemplary embodiment of the present invention.

Referring to FIG. 4A, in step 401, the UE 410 encounters the RLF or handover failure in a cell 1, wherein the cell 1 is a cell controlled by an eNB1 421.

In step 402, the UE 410 initiates a process of RRC connection re-establishment or a process of RRC connection establishment re-establishment in a cell 2, wherein the cell 2 is a cell controlled by an eNB2 422. In step 402, the UE 410 may initiate the process of the RRC connection re-establishment in the cell 2, and the RRC connection re-establishment succeeds; or, the UE 410 may initiate the process of the RRC connection establishment after the UE 410 fails in initiating the RRC connection re-establishment in the cell 2, and the RRC connection establishment succeeds; or, after the UE 410 fails in initiating the RRC connection re-establishment or RRC connection establishment in other cells, the RRC connection establishment in the cell 2 succeeds. An RRC connection re-establishment complete message or an RRC connection establishment complete message may contain an available RLF information indication, and the available RLF information may be RLF information or handover failure information.

In step 403, the UE 410 goes into an active state, connects to an Evolved Universal Terrestrial Radio Access Network (E-UTRAN) system, and transmits an RLF information report to the eNB2 422. The active state may be referred as a connection mode. The RLF information report contains the same contents as those in the failure information transmitted by the UE to the eNB in step 302, and will not be described again herein.

In step 404, the eNB2 422 transmits the RLF information report to the eNB1 421 controlling the cell where the RLF occurs. In step 404, the eNB2 422 finds the eNB1 421 according to the identity of the cell where the RLF or handover failure occurs. The RLF information contains, the results of measuring the serving cell of the UE 410 and the neighboring cell of the UE 410 by the UE 410 when the UE 410 encounters the RLF or handover failure; and/or, whether the UE 410 has been recently handed over before encountering the RLF or handover failure; the identity of the cell where the UE 410 is located before the UE 410 hands over to a cell in which the RLF or handover failure occurs; and/or, the identity of the cell in which the RLF or handover failure occurs; and/or, the amount of time between when the RLF or handover failure occurs and when the subsequent RRC connection re-establishment success or RRC connection establishment success occurs; the identity of the cell in which the RRC connection is re-established or the RRC connection is established, such as the ECGI. The RLF information report may be an RLF Indication message of the related art or a new message.

It should be noted that, similar to step 302, in step 403 and step 404, it may also be the UE 410 that determines whether the UE has been recently handed over before encountering the RLF or handover failure, and then the UE 410 transmits an instruction, such as the instruction that the UE 410 has been recently handed over, to the eNB. Or, the UE 410 may directly transmit the amount of time between when the UE 410 receives the last handover command and when the RLF or handover failure occurs to the eNB, and the eNB determines whether the UE 410 has been recently handed over before encountering the RLF or handover failure.

In step 405, the eNB1 421 determines the cause of the RLF or handover failure encountered by the UE 410. It should be noted that, when the eNB1 421 determines that the failure cause is a too early handover or handover to a wrong cell, the eNB1 421 transmits a too-early-handover report or a handover-to-wrong-cell report to a source cell (i.e., the cell triggers the handover).

Figure 4B:
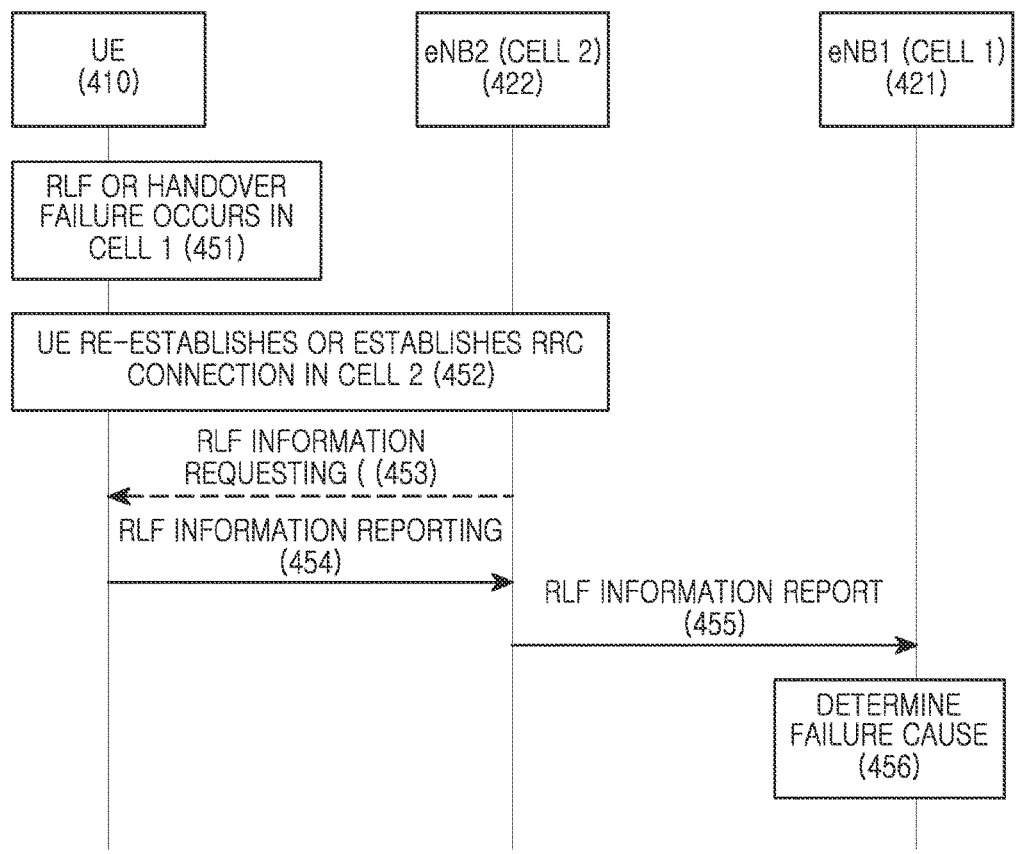
FIG. 4B is a flowchart illustrating how a UE transmits RLF or handover failure information to an eNB according to another exemplary embodiment of the present invention.

FIG. 4B is a flowchart illustrating how a UE transmits RLF or handover failure information to an eNB according to another exemplary embodiment of the present invention.

Referring to FIG. 4A, in step 451, the UE 410 encounters the RLF or handover failure in a cell 1, wherein the cell 1 is a cell controlled by an eNB1 421.

In step 452, the UE 410 initiates a process of RRC connection re-establishment or a process of RRC connection establishment in a cell 2, wherein the cell 2 is a cell controlled by an eNB2 422. In step 452, the UE 410 may initiate the process of the RRC connection re-establishment in the cell 2, and the RRC connection re-establishment succeeds; or, the UE 410 may initiate the process of the RRC connection establishment after the UE 410 fails in initiating the RRC connection re-establishment in the cell 2, and the RRC connection establishment succeeds; or, after the UE 410 fails in initiating the RRC connection re-establishment or RRC connection establishment in other cells, the RRC connection establishment in the cell 2 succeeds. An RRC connection re-establishment complete message or an RRC connection establishment complete message may contain an available RLF information indication, and the available RLF information may be RLF information or handover failure information.

In step 453, when the UE 410 goes into an active state and connects to an E-UTRAN system, the eNB2 422 transmits an RLF information request to the UE 410. Accordingly, in step 454, the UE 410 transmits the RLF information report to the eNB2 422 after receiving the RLF information request. The RLF information requesting process and the RLF information reporting process may be respectively a UE information requesting process of the related art and a UE information response process of the related art, or may be a newly-defined RRC messaging process. The RLF information report contains the same contents as those in the failure information transmitted by the UE to the eNB in step 302, and thus will not be described again herein.

In step 455, the eNB2 422 transmits the RLF information report to the eNB1 421 controlling the cell where the RLF occurs. In step 454, the eNB2 422 finds the eNB1 421 according to the identity of the cell where the RLF or handover failure occurs. The RLF information contains, the results of measuring the serving cell of the UE 410 and the neighboring cell of the UE 410 by the UE 410 when the UE 410 encounters the RLF or handover failure; and/or, whether the UE 410 has been recently handed over before encountering the RLF or handover failure; the identity of the cell where the UE 410 is located before the UE 410 hands over to a cell in which the RLF or handover failure occurs; and/or, the identity of the cell in which the RLF or handover failure occurs; and/or, the amount of time between when the RLF or handover failure occurs and when the subsequent RRC connection re-establishment success or RRC connection establishment success occurs; the identity of the cell in which the RRC connection is re-established or the RRC connection is established, such as the ECGI. The RLF information report may be an RLF Indication message of the related art or a new message.

It should be noted that, similar to step 302, in step 454 and step 455, it may also be the UE 410 that determines whether the UE has been recently handed over before encountering the RLF or handover failure, and then the UE 410 transmits an instruction, such as the instruction that the UE 410 has been recently handed over, to the eNB. Or, the UE 410 may directly transmit the amount of time between when the UE 410 receives the last handover command and when the RLF or handover failure occurs to the eNB, and the eNB determines whether the UE 410 has been recently handed over before encountering the RLF or handover failure.

In step 456, the eNB1 421 determines the cause of the RLF or handover failure encountered by the UE 410. It should be noted that, when the eNB1 421 determines that the cause of failure is a too early handover or a handover to a wrong cell, the eNB1 421 transmits a too-early-handover report or a handover-to-wrong-cell report to a source cell (i.e., the cell triggers the handover).

Thus, the whole procedure of the UE transmitting the RLF or handover failure information to the eNB in this exemplary embodiment is finished. After receiving the RLF or handover failure information transmitted by the UE, the eNB should correctly determine the cause of the RLF or handover failure encountered by the UE, and this specific processing flowchart is illustrated in FIG. 5.

Figure 5:
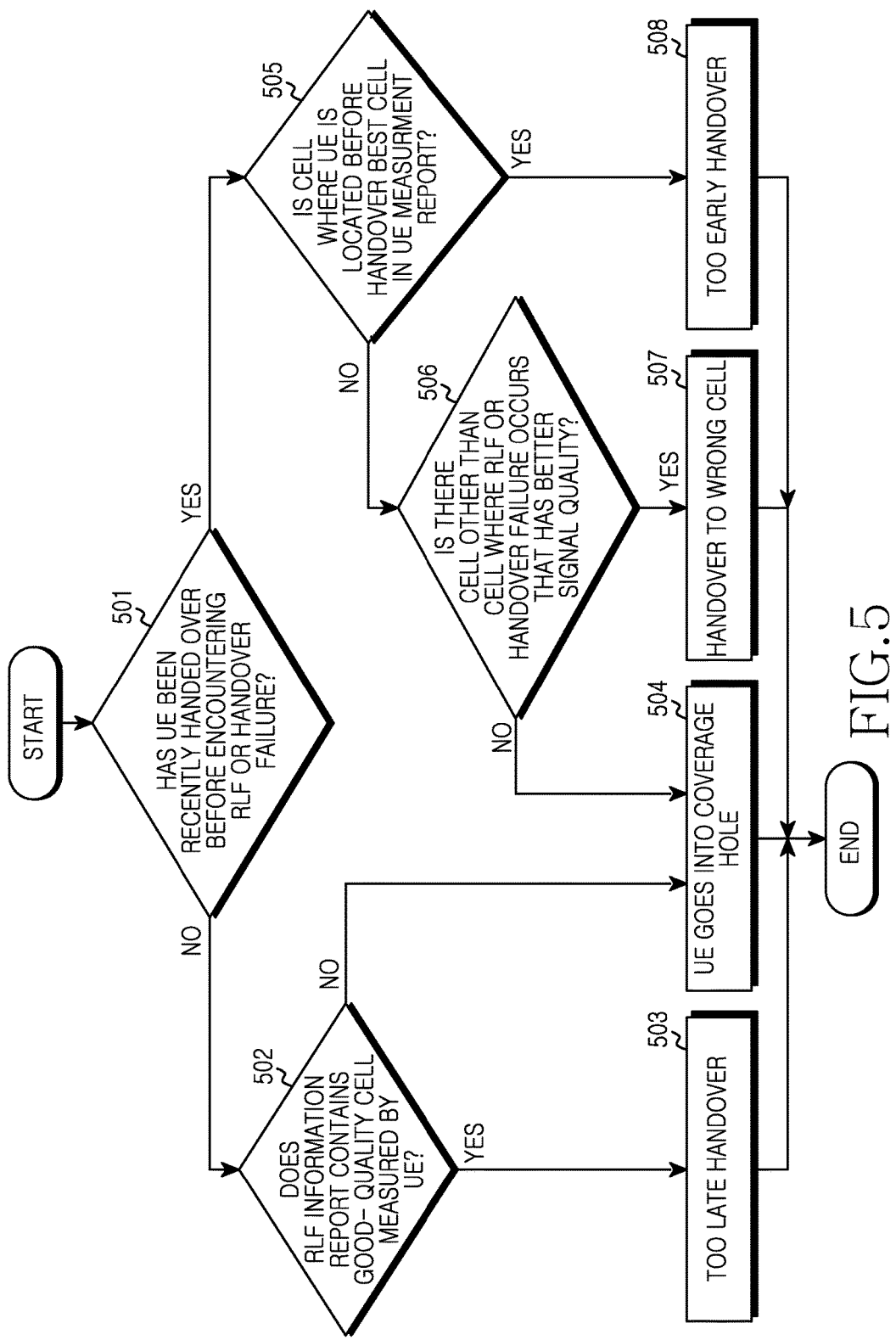
FIG. 5 is a flowchart of a method for an eNB to determine a cause of an RLF or a handover failure according to an exemplary embodiment of the present invention.

FIG. 5 is a flowchart of a method for an eNB determining a cause of RLF or handover failure according to an exemplary embodiment of the present invention.

Referring to FIG. 5, in step 501, the eNB determines whether the UE has been recently handed over before encountering the RLF or handover failure. If no, step 502 is performed. Otherwise, step 505 is performed.

Herein, the eNB may directly know whether the UE has been recently handed over before the failure occurs according to an instruction from the UE on whether the UE has been recently handed over before encountering the RLF or handover failure. Or, the eNB may make the determination directly by itself.

According to the amount of time between when the UE receives the last handover command and when the RLF or handover failure subsequently occurs from the UE, the eNB determines whether the UE has been recently handed over through determining whether the amount of time is larger than the threshold, and the amount of time indicates the period between when the UE receives the last handover command and when the RLF or handover failure subsequently occurs. When the amount of time is larger than the threshold, there is no recent handover for the UE. Otherwise, there is recent handover for the UE before the connection failure.

In step 502, the eNB determines whether the RLF information report transmitted by the UE contains information of a good-signal-quality cell measured by the UE. If yes, step 503 is performed. Otherwise, step 504 is performed.

In step 503, when the RLF information report contains the information of the good-signal-quality cell measured by the UE, the eNB determines that the cause of the RLF or handover failure encountered by the UE is a too late handover, and the whole procedure is terminated.

In step 504, when there is no good-signal-quality cell measured by the UE in the RLF information report, the eNB determines that the cause of the RLF or handover failure encountered by the UE is a coverage hole, and the whole procedure is terminated.

In step 505, the eNB determines whether the cell with best signal quality in the UE measurement report included in the RLF report is a cell corresponding identity of the cell where the UE is located before handing over to the last cell serving the UE. If yes, step 508 is performed. Otherwise, step 506 is performed. The identity may include the ECGI.

In step 506, the eNB determines whether there is another cell with a better signal quality (i.e., not the cell in which RLF of handover failure occurs). If yes, step 507 is performed. Otherwise, step 504 is performed wherein the eNB determines that the cause of the RLF or handover failure encountered by the UE is a coverage hole In step 507, when the eNB determines that there is another cell with a better signal quality, the eNB determines that the cause of the RLF or handover failure encountered by the UE is handover to a wrong cell, and the whole procedure is terminated.

In step 508, when the eNB determines that the cell with best signal quality in the UE measurement report included in RLF information report is the cell corresponding identity of the cell where the UE is located before handing over to the last cell serving the UE, the eNB determines that the cause of the RLF or handover failure encountered by the UE is a too early handover, and then the whole procedure is terminated.

Thus, the whole procedure for the eNB determining the cause of the RLF or handover failure is finished.

It should be noted that, when the eNB determines that the UE goes into a coverage hole or tries to hand over but goes into the coverage hole, the eNB should further determine the size of the coverage hole according to the amount of time between when the RLF or handover failure occurs and when the subsequent RRC connection re-establishment success or RRC connection establishment success occurs, and then perform coverage optimization.

And thus, the whole procedure for the eNB determining the cause of the RLF or handover failure is finished.

In the exemplary embodiment illustrated in FIG. 5, step 501, step 502, step 505 and step 506 represent conditions to determine the cause of the RLF or handover failure. In another exemplary embodiment of the present invention, at least one of step 501, step 502, step 505 and step 506 may be omitted. For example, the eNB may determine that the cause of the RLF or handover failure encountered by the UE is a too late handover when a condition in step 501 is met without performing step 502.

It should also be noted that, although FIGS. 4A, 4B and 5 take the SAE system as an example to describe the method for detecting the cause of the RLF or handover failure encountered by the UE, the method can also be applied to other systems as long as exemplary embodiments of the present invention can be realized.

In summary, in the method for detecting the cause of the RLF or handover failure encountered by the UE in an exemplary embodiment of the present invention, the UE transmits the RLF information report containing the RLF or handover failure information to the eNB, so that the eNB can correctly determine the cause of the RLF or handover failure encountered by the UE according to the received RLF information report, and thereby can further perform correct self-optimization for the mobile communication system according to the detected cause. Furthermore, performance of the mobile communication system is improved.

Figure 6:
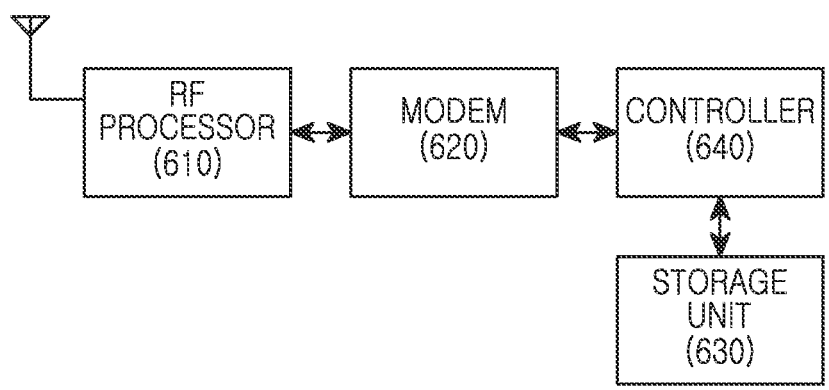
FIG. 6 is a block diagram of a UE in a mobile communication system according to an exemplary embodiment of the present invention.

FIG. 6 is a block diagram of a UE in a mobile communication system according to an exemplary embodiment of the present invention.

Referring to FIG. 6, the UE includes a Radio Frequency (RF) processor 610, a modem 620, a storage unit 630 and a controller 640.

The RF processor 610 performs functions, such as signal band conversion and amplification, to transmit and receive signals over a radio channel. That is, the RF processor 610 up-converts a baseband signal output from the modem 620 into the RF signal and transmits the RF signal over an antenna, and down-converts the RF signal received over the antenna into the baseband signal. Although not illustrated, for example, the RF processor 610 may include an amplifier, a mixer, an oscillator, a Digital to Analog Convertor (DAC), an Analog to Digital Convertor (ADC), and the like.

The modem 620 converts the baseband signal and a bit string according to a physical layer standard of the system. For example, to transmit data, the modem 620 generates complex symbols by encoding and modulating a transmit bit string, maps the complex symbols to subcarriers, and constitutes Orthogonal Frequency-Division Multiplexing (OFDM) symbols by applying Inverse Fast Fourier Transform (IFFT) and inserting a Cyclic Prefix (CP). When receiving data, the modem 620 splits the baseband signal output from the RF processor 610 into OFDM symbols, restores the signals mapped to the subcarriers using Fast Fourier Transform (FFT), and restores the receive bit string by demodulating and decoding the signals.

The storage unit 630 stores basic programs used for the operations of the UE and system information. The storage unit 630 provides stored data to the controller 640 upon a request from the controller 640.

The controller 640 controls the overall functions of the UE. For example, the controller 640 generates a transmit packet and a message and provides the modem 620 with the transmit packet and the message. The controller 640 also processes a receive packet and a message from the modem 620. More particularly, according to an exemplary embodiment of the present invention, the controller 640 controls to provide an RLF information report when encountering the RLF or the handover failure. For example, the controller 640 controls so that the UE operates as UE 410 illustrated in FIG. 4A or FIG. 4B. An operation of the controller 640 to provide the RLF information report is described as follows.

When encountering the RLF or the handover failure, the controller 640 performs a process of a RRC connection re-establishment or RRC connection establishment to go into a connection mode. After entering the connection mode, the controller 640 generates the RLF information report, and controls the modem 620 and the RF processor 610 to transmit the RLF information report to a connected eNB. At this time, the controller 640 transmits the RLF information report without any request, or transmits the RLF information report upon receiving a request from the eNB. Herein, the RLF information report comprises at least one of information on whether the UE has been recently handed over before encountering the RLF or handover failure, the UE measurement results of the serving cell and the neighboring cell of the UE when the RLF or handover failure occurs, an identity of the cell where the UE is located before the UE hands over to the cell in which the RLF or handover failure occurs, an identity of the cell in which the RLF or handover failure occurs, and, the amount of time between when the RLF or handover failure occurs and when the subsequent RRC connection re-establishment success or RRC connection establishment success occurs.

The information on whether the UE has been recently handed over before encountering the RLF or the handover failure includes at least one of an instruction that instructs whether the UE has been recently handed, and, an amount of time between when the UE receives the last handover command and when the RLF or the handover failure occurs. When the instruction is included, the controller 640 determines whether the UE has been recently handed over before encountering the RLF or the handover failure, and controls to transmit the instruction. When the amount of time is included, the controller 640 controls to transmit the amount of time.

Figure 7:
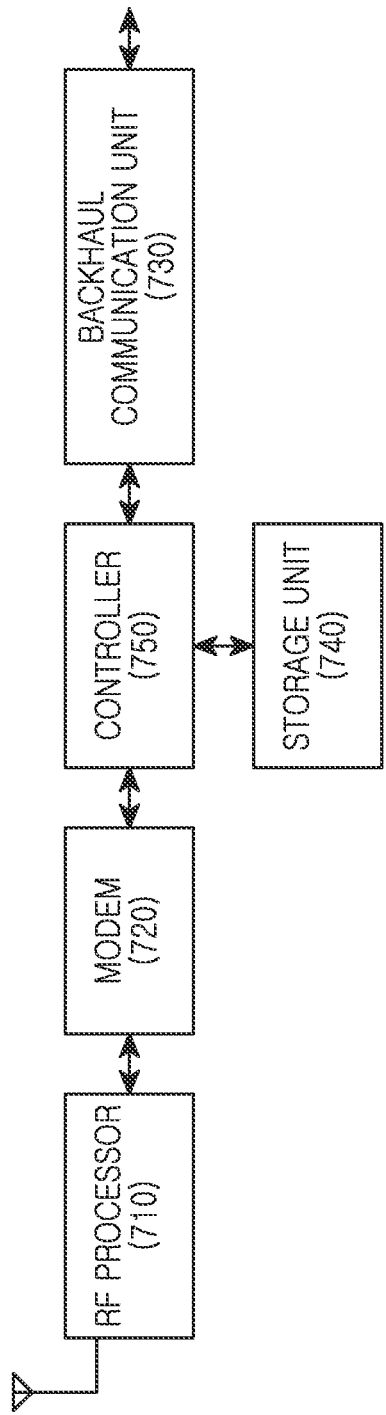
FIG. 7 is a block diagram of an eNB in a mobile communication system according to an exemplary embodiment of the present invention.

FIG. 7 is a block diagram of an eNB in a mobile communication system according to an exemplary embodiment of the present invention.

Referring to FIG. 7, the eNB includes an RF processor 710, a modem 720, a backhaul communication unit 730, a storage unit 740 and a controller 750.

The RF processor 710 performs functions, such as signal band conversion and amplification, to transmit and receive signals over a radio channel. That is, the RF processor 710 up-converts a baseband signal output from the modem 720 into the RF signal and transmits the RF signal over an antenna, and down-converts the RF signal received over the antenna into the baseband signal. Although not illustrated, for example, the RF processor 710 may include an amplifier, a mixer, an oscillator, a DAC, an ADC and the like.

The modem 720 converts the baseband signal and a bit string according to a physical layer standard of the system. For example, to transmit data, the modem 720 generates complex symbols by encoding and modulating a transmit bit string, maps the complex symbols to subcarriers, and constitutes OFDM symbols by applying IFFT and inserting a CP. When receiving data, the modem 720 splits the baseband signal output from the RF processor 710 into OFDM symbols, restores the signals mapped to the subcarriers using FFT, and restores the receive bit string by demodulating and decoding the signals.

The backhaul communication unit 730 provides an interface for the eNB to communicate with other entities (i.e., other eNBs, a Mobile Management Entity (MME), a Gate-Way (GW) and the like). More specifically, the backhaul communication unit 730 converts the bit string transmitted by the eNB into a physical signal, and converts the physical signal received at the eNB into the bit string. For example, the backhaul communication unit 730 supports an X2 interface. The storage unit 740 stores programs and system information used for the operations of the eNB. The storage unit 740 provides stored data to the controller 750 upon a request from the controller 750.

The controller 750 controls the overall functions of the eNB. For example, the controller 750 generates a transmit packet and a message and provides the modem 720 with the transmit packet and the message. The controller 750 also processes a receive packet and a message from the modem 720. The controller 750 generates and analysis messages for signaling with other nodes. More particularly, according to an exemplary embodiment of the present invention, the controller 750 controls to transmit an RLF information report from a UE to an eNB controlling a cell where the RLF or the handover failure occurs. Further, according to an exemplary embodiment of the present invention, the controller 750 controls to receive the RLF information report regarding to the RLF or the handover failure which occurs in own cell from another eNB and determines a cause of the RLF or the handover failure encountered by the UE based on the RLF information. For example, the controller 750 controls so that the eNB operates as the eNB1 421 or the eNB2 422 illustrated in FIG. 4A or FIG. 4B.

An operation of the controller 750 to transmit an RLF information report from a UE to an eNB controlling a cell where the RLF or the handover failure occurs is described as follows. First, the controller 750 performs a process of a RRC connection re-establishment or RRC connection establishment for a UE encountering the RLF or the handover failure, and receives the RLF information report from the UE through the RF processor 710 and the modem 720. Before receiving the RLF information report, the controller 750 may transmit a request to transmit the RLF information report to the UE. Then, the controller 750 transmits the RLF information report to another eNB which controls a cell where the RLF or the handover failure occurs through the backhaul communication unit 730. Herein, the RLF information report information on whether the UE has been recently handed over before encountering the RLF or the handover failure. Further, the information on whether the UE has been recently handed over before encountering the RLF or the handover failure includes at least one of an instruction that instructs whether the UE has been recently handed, and, an amount of time between when the UE receives the last handover command and when the RLF or the handover failure occurs.

An operation of the controller 750 to receive the RLF information report and to determine the cause of the RLF or the handover failure is described as follows. The controller 750 receives the RLF information report generated by a UE encountering the RLF or the handover failure from another eNB through the backhaul communication unit 730, and determines the cause of the RLF or the handover failure using the RLF information report. For example, the controller 750 determines that the cause of the RLF or the handover failure is a too late handover when satisfying at least one condition of a condition that the UE has not been recently handed over before encountering the RLF or the handover failure and a condition that the RLF information report comprises information of a cell with good signal quality. For example, the controller 750 determines that the cause of the RLF or the handover failure is the too early handover when satisfying at least one condition of a condition that the UE has been recently handed over before encountering the RLF or the handover failure and a condition that a cell where the UE is located before handing over to a cell where the RLF or the handover failure occurs has the best signal quality in the RLF information report. For example, the controller 750 determines that the cause of the RLF or the handover failure is a handover to wrong cell when satisfying at least one condition of a condition that the UE has been recently handed over before encountering the RLF or the handover failure, a condition that that a cell where the UE is located before handing over to a cell where the RLF or the handover failure occurs or a cell where RLF or the handover failure occurs does not have the best signal quality in the RLF information report but another cell has a better signal quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station (BS) in a mobile communication system, the method comprising:
   receiving a radio link failure (RLF) information report generated by a terminal after an RLF or a handover failure from another BS; and
   determining a cause of the RLF or the handover failure based on the RLF information report,
   wherein the RLF information report comprises information regarding time elapsed since a reception of a command for a handover until the RLF or the handover failure, and
   wherein the cause of the RLF or the handover failure comprises a too early handover, a too late handover, or a handover to a wrong cell.

2. The method of claim 1, wherein the elapsed time is used to determine whether there is a recent handover of the terminal.

3. The method of claim 1, wherein the determining of the cause of the RLF or the handover failure comprises determining the cause of the RLF or the handover failure based on a timer.

4. The method of claim 3, wherein the timer is configured to measure an amount of time elapsed since the last handover until the RLF or the handover failure occurred.

5. The method of claim 1, wherein the cause of the RLF or the handover failure is determined as the too early handover if the elapsed time is less than a threshold.

6. The method of claim 1, wherein the cause of the RLF or the handover failure is determined as the too late handover if the elapsed time is greater than a threshold.

7. The method of claim 1, wherein the cause of the RLF or the handover failure is determined as the handover to a wrong cell if the elapsed time is less than a threshold and the terminal receives a command for a handover from the another BS.

8. The method of claim 1, wherein the cause of the RLF or the handover failure is determined as the handover to a wrong cell if the elapsed time is less than a threshold and the RLF or the handover failure occurs between the terminal and the another BS.

9. A method for operating a terminal in a mobile communication system, the method comprising:
   performing a connection re-establishment or connection establishment in response to a radio link failure (RLF) or a handover failure; and
   transmitting an RLF information report to a base station (BS) after the connection,
   wherein the RLF information report comprises information regarding time elapsed since a reception of a command for a handover until the RLF or the handover failure, and
   wherein the cause of the RLF or the handover failure comprises a too early handover, a too late handover, or a handover to a wrong cell.

10. A method for operating a base station (BS) in a mobile communication system, the method comprising:
    performing a connection re-establishment or connection establishment for a terminal in response to a radio link failure (RLF) or a handover failure in a cell of another BS;
    receiving an RLF information report from the terminal; and
    transmitting the RLF information report to the another BS,
    wherein the RLF information report comprises information regarding time elapsed since a reception of a command for a handover until the RLF or the handover failure, and
    wherein the cause of the RLF or the handover failure comprises a too early handover, a too late handover, or a handover to a wrong cell.

11. A base station (B S) for use in a mobile communication system, the BS comprising:
    a backhaul communication unit configured to receive a radio link failure (RLF) information report generated by a terminal after an RLF or a handover failure from another B S; and
    a controller configured to determine a cause of the RLF or the handover failure based on the RLF information report,
    wherein the RLF information report comprises information regarding time elapsed since a reception of a command for a handover until the RLF or the handover failure, and
    wherein the cause of the RLF or the handover failure comprises a too early handover, a too late handover, or a handover to a wrong cell.

12. The base station of claim 11, wherein the elapsed time is used to determine whether there is a recent handover of the terminal.

13. The base station of claim 11, wherein the controller is further configured to determine the cause of the RLF or the handover failure based on a timer.

14. The base station of claim 13, wherein the timer is configured to measure an amount of time elapsed since the last handover until the RLF or the handover failure occurred.

15. The base station of claim 11, wherein the controller is further configured to determine that the cause of the RLF or the handover failure is the too early handover if the elapsed time is less than a threshold.

16. The base station of claim 11, wherein the controller is further configured to determine that the cause of the RLF or the handover failure is the too late handover if the elapsed time is greater than a threshold.

17. The base station of claim 11, wherein the controller is further configured to determine that the cause of the RLF or the handover failure is handover to a wrong cell if the elapsed time is less than a threshold and the terminal receives a command for a handover from the another BS.

18. The base station of claim 11, wherein the controller is further configured to determine that the cause of the RLF or the handover failure is handover to a wrong cell if the elapsed time is less than a threshold and the RLF or the handover failure occurs between the terminal and the another BS.

19. A terminal for use in a mobile communication system, the terminal comprising:
    a controller configured to perform a connection re-establishment or connection establishment, if a radio link failure (RLF) or a handover failure occurs; and
    a transmitter configured to transmit an RLF information report from the terminal to a base station (BS) after the process,
    wherein the RLF information report comprises information regarding time elapsed since a reception of a command for a handover until the RLF or the handover failure, and
    wherein the cause of the RLF or the handover failure comprises a too early handover, a too late handover, or a handover to a wrong cell.

20. A base station (BS) for use in a mobile communication system, the BS comprising:
    a controller configured to perform a connection re-establishment or connection establishment for a terminal in response to a radio link failure (RLF) or a handover failure in a cell of another BS;
    a receiver configured to receive an RLF information report from the terminal; and
    a backhaul communication unit configured to transmit the RLF information report to the another BS,
    wherein the RLF information report comprises information regarding time elapsed since a reception of a command for a handover until the RLF or the handover failure, and
    wherein the cause of the RLF or the handover failure comprises a too early handover, a too late handover, or a handover to a wrong cell.

* * * * *